(12) United States Patent
Ghosh

(10) Patent No.: US 6,180,727 B1
(45) Date of Patent: *Jan. 30, 2001

(54) CAPPED ESTER CONTAINING EPOXY AMINE ADDUCT CURING AGENTS FOR CURING EPOXY RESINS AT AMBIENT OR SUB-AMBIENT TEMPERATURES WITHOUT EXTERNAL CATALYSTS

(75) Inventor: Kalyan Ghosh, Richmond, TX (US)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/002,271

(22) Filed: Dec. 31, 1997

Related U.S. Application Data
(60) Provisional application No. 60/033,956, filed on Dec. 31, 1996.

(51) Int. Cl.$^7$ .............................. C08G 59/14; C08G 59/16
(52) U.S. Cl. .................. 525/524; 525/423; 525/430; 525/438; 525/449; 525/533; 525/934
(58) Field of Search .................................. 525/423, 430, 525/438, 449, 524, 533, 934

(56) References Cited

U.S. PATENT DOCUMENTS

| | | | |
|---|---|---|---|
| 3,034,879 | 5/1962 | Spacht | 44/71 |
| 3,542,728 | 11/1970 | Gersmann et al. | 260/45.85 |
| 3,785,790 | 1/1974 | Strang | 44/66 |
| 3,954,964 | 5/1976 | Kuderna, Jr. | 424/76 |
| 4,090,971 | 5/1978 | Hoke | 252/51.5 A |
| 4,177,174 | 12/1979 | Hayashi | 260/18 PN |
| 4,229,335 | * 10/1980 | Ting et al. | 260/29.4 |
| 4,388,426 | 6/1983 | Schure et al. | 523/462 |
| 4,457,800 | 7/1984 | Schure et al. | 156/307.3 |
| 4,457,809 | 7/1984 | Schure et al. | 156/307.3 |
| 4,609,695 | 9/1986 | Geist et al. | 523/415 |
| 4,673,765 | 6/1987 | Bertram et al. | 564/155 |
| 5,290,463 | 3/1994 | Habeeb | 252/51.5 A |
| 5,354,789 | 10/1994 | Kamikado | 523/420 |
| 5,567,748 | * 10/1996 | Klein et al. | 523/420 |
| 5,643,976 | 7/1997 | Arora et al. | 523/404 |
| 5,770,658 | 6/1998 | Baudoul et al. | 525/423 |
| 5,880,228 | * 3/1999 | Marten | 525/524 |
| 5,936,046 | * 8/1999 | Ghosh | 525/449 |

FOREIGN PATENT DOCUMENTS

| | | | |
|---|---|---|---|
| 864-953 | 9/1978 | (BE) . | |
| 163890 | 7/1976 | (CS) | C08G/30/16 |
| 48078-254 | 10/1973 | (JP) . | |
| 50117-899 | 9/1975 | (JP) . | |
| 57105-447 | 6/1982 | (JP) | C08K/3/34 |
| 61172153 | 8/1986 | (JP) | G03G/9/08 |
| 2-018412 | * 1/1990 | (JP) . | |
| 05271584 | 10/1993 | (JP) | C09D/5/46 |
| 07207197 | 8/1995 | (JP) . | |
| 100766 | 3/1979 | (PL) | C08L/63/00 |

OTHER PUBLICATIONS

Chemical Abstracts vol. 86, 1977 86:122373v (copy attached).
Chemical Abstracts 92:95260w (copy attached).

* cited by examiner

Primary Examiner—Robert Dawson
Assistant Examiner—Jeffrey B. Robertson
(74) Attorney, Agent, or Firm—Dennis V. Carmen

(57) ABSTRACT

There is provided a curing agent composition, a method for making a curing agent composition, two component curable epoxy resin compositions, methods of their manufacture, and the different cured products thereof. The curing agent comprises the reaction product of a a) phenolic acid substituted with at least one carboxyl group and at least one hydrocarbyl group having at least 1 carbon atom; b) a polyepoxide compound; c) a polyamine compound having at least two primary amine groups; and d) a monoglycidyl capping agent. The curing agents contain secondary amine groups, yet are reactive enough to cure epoxy resins without the necessity for external catalysts/accelerators, at a wide range of curing temperatures and are immediately compatible with a standard diglycidyl ether of Bisphenol-A epoxy resins.

44 Claims, No Drawings

US 6,180,727 B1

CAPPED ESTER CONTAINING EPOXY AMINE ADDUCT CURING AGENTS FOR CURING EPOXY RESINS AT AMBIENT OR SUB-AMBIENT TEMPERATURES WITHOUT EXTERNAL CATALYSTS

This application claims the benefit of U.S. Provisional Application Ser. No. 60/033,956, filed Dec. 31. 1996, the entire disclosure of which is hereby incorporated by reference.

1. FIELD OF THE INVENTION

This invention is related to curing agent composition for epoxy resins, to two component solvent borne or solventless systems having enhanced compatibility between the epoxy resin and the curing agent, which are rapidly heat curable at ambient and sub-ambient temperatures in the absence of external catalysts/accelarators. The invention is also directed to methods of application and manufacture, as well as to the cured products made thereby.

2. BACKGROUND OF THE ART

There has long been a desire to formulate a curing agent which is immediately compatible with conventional epoxy resins, especially at low curing temperatures, and which is sufficiently reactive with epoxy resins that the system will cure in a wide range of temperatures, even as low as 4.4° C., within a 24 hour period in the absence of external accelarators if possible.

Typical amine curing agents, whether aliphatic, aromatic, or adducts with epoxy resins, have terminated with at least one primary amine group. The primary amines are notorious for producing the undesired side effect of blooming or hazing in the cured product. This phenomena is thought to result from the reaction between the highly reactive primary amine groups in the curing agent with atmospheric carbon dioxide and moisture to produce carbamates, resulting in scission of the curing agent polymer chain. Blooming or hazing is more likely to be encountered when the curing agent is stored for a lengthy period of time, and applied in low temperature or high humidity environments.

To some extent, this problem can be ameliorated by reacting out many of the primary amine hydrogens. The drawback to this approach in the past has been that the reactivity of the curing agent was impaired because secondary amines are less reactive than the primary amines, such that accelerators had to be used to obtain adequate cure times, especially at low curing temperatures. Furthermore, many of the amine curing agent adducts whose primary amine groups were converted to secondary amine groups are poorly compatible with epoxy resin.

It would be desirable to have a curing agent composition for curing epoxy resins whose primary amine groups are converted to secondary amine groups, yet is reactive enough to cure epoxy resins without external catalysts/accelerators in a wide range of curing temperatures and which is immediately compatible with a standard diglycidyl ether of Bisphenol-A.

3. SUMMARY OF THE INVENTION

There is provided a curing agent composition, a method for making a curing agent composition, two component curable epoxy resin compositions, methods of their manufacture, and the different cured products thereof. The curing agent comprises the reaction product of an a) a phenolic acid substituted with at least one carboxyl group and at least one hydrocarbyl group having at least 1 carbon atom; b) a polyepoxide compound; c) a polyamine compound having at least two primary amine groups; and d) a monoglycidyl capping agent. The compounds produced by this reaction can be characterized by having a β-hydroxy ester group and a β-hydroxy secondary amine group, terminated with moieties unreactive towards epoxide groups at room temperature in the absence of catalysts, and having one or more secondary amine sites throughout the compound.

Preferably, the phenolic acid compound is reacted with the polyepoxide compound to produce a substituted aromatic glycidyl ester compound, which is combined and reacted with the polyamine compound and the monoglycidyl capping agent. Preferable phenolic acid compounds are those having an 8 to 36 carbon branched or unbranched alkyl group.

There is also provided a two component epoxy resin composition using this curing agent composition, methods for their manufacture, and the cured products made thereby.

4. DETAILED DESCRIPTION OF THE INVENTION

The curing agents of the invention exhibit a good overall balance of mechanical and chemical properties. The curing agents of the invention can cure epoxy resins neat or modified within 24 hours at temperatures as low as 4.4° C. in the absence of external accelarators or catalysts. The curing agents can cure epoxy resins at 4.4° in as short a time as within 15 hours in the absence of external accelarators. While not being limited to a theory, it is believed that the compositions can self cure without external accelarators, even at low temperatures, because the curing agent adduct contains phenolic hydroxyl groups which catalyze a reaction between the epoxide groups of the epoxy resin and the amine nitrogens of the curing agent. The curing agents also have the advantage of enhanced compatibility with epoxy resins as evidenced by the clarity of the epoxy resin/curing agent mixtures almost immediately upon mixing. This enhanced compatibility makes it unnecessary to have an induction time, improves the curing rate, and ultimately improves the mechanical properties of the cured product as compared to similar products made with conventional curing agents and given little or no induction time.

The curing agent is made by reacting a a) phenolic acid substituted with at least one carboxyl group and at least one hydrocarbyl group having at least 1, and preferably 8 or more, more preferably 14 or more carbon atoms, b) a polyepoxide compound c) a polyamine compound having at least two primary amine groups and d) a monoglycidyl capping agent. The ingredients a)–d) should be reacted in a sequence which will produce a compound characterized by having a β-hydroxy ester group and a β-hydroxy secondary amine group, terminated with moieties unreactive towards epoxide groups at room temperature in the absence of catalysts, and having one or more epoxide reactive secondary amine sites throughout the compound. Preferably, the phenolic acid compound is reacted with a polyepoxide compound to make a substituted aromatic glycidyl ester, which ester is combined with the polyamine compound and monoglycidyl capping agent. More preferably, the substituted aromatic glycidyl ester is reacted first with the total amount of the polyamine compound used in the manufacture of the curing agent, to make a glycidyl ester-amine adduct, followed by addition of the monoglycidyl capping agent with the adduct.

In another embodiment, however, one may first react the monoglycidyl capping agent with the polyamine compound to convert one of the primary amine groups to a secondary amine group, followed by reaction of the polyepoxide compound onto the free primary amine group, and finishing the reaction with addition of the phenolic acid compound onto the free epoxide linkage.

Whichever approach is used, the sequences of addition and reaction should be such to produce compounds having the above described features, that is, a β-hydroxy ester group

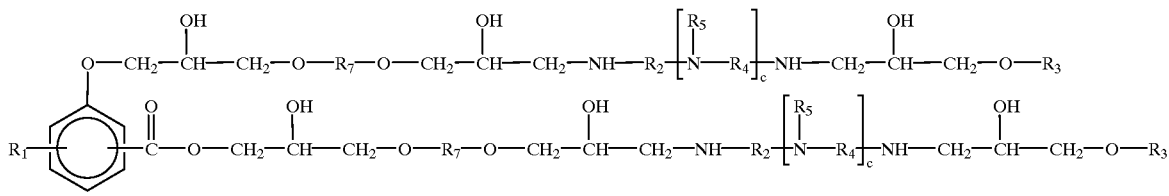

and a β-hydroxy secondary amine group, terminated with moieties unreactive towards epoxide groups at room temperature in the absence of catalysts, and having one or more epoxide reactive secondary amine sites throughout the compound. The preferred method is the former described method, where the polyepoxide compound is reacted with the phenolic acid to make a substituted aromatic glycidyl ester composition, followed by combing and reacting onto the substituted aromatic glycidyl ester composition the polyamine and monoglycidyl capping agent in the stated sequence or as a mixture, more preferably in the stated sequence.

In one embodiment, the curing agent compound is characterized by the following structure:

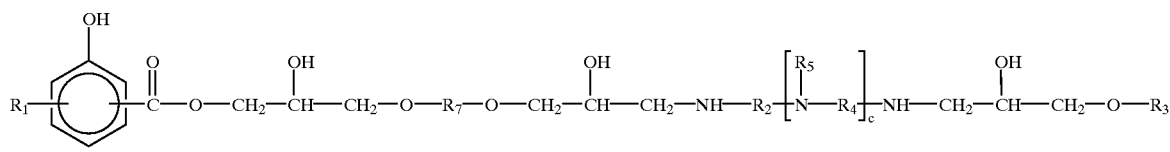

wherein $R_1$ is a branched or unbranched, substituted or unsubstituted, monovalent hydrocarbyl group having at least one carbon atom, preferably an alkyl group having at least an average of at least 14 carbon atoms; $R_2$ and $R_4$ each independently represent a branched or unbranched, substituted or unsubstituted, divalent hydrocarbyl group having 2–24 carbon atoms, preferably 2–6 carbon atoms, or

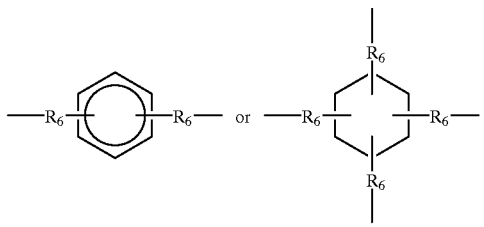

wherein $R_6$ represents a branched or unbranched, substituted or unsubstituted, divalent hydrocarbyl group having 2–24 carbon atoms; $R_3$ is a branched or unbranched, substituted or unsubstituted, monovalent hydrocarbyl having 1–24 carbon atoms, a polyoxyalkylene group, an aryl group, an alkaryl group, or an aralkyl group; $R_5$ is hydrogen or a branched or unbranched, substituted or unsubstituted, monovalent hydrocarbyl having 1–24 carbon atoms, preferably hydrogen; $R_7$ is the residue of said polyepoxide compound; and c represents an integer from 0–10, preferably from 1–10.

Other species may be present in the curing agent composition, such as:

wherein each R group and c is as described above.

The structure of the phenolic acid is an aromatic ring to which is covalently bonded at least one hydroxyl group, at least one hydrocarbyl group, and at least one carboxyl group. Usually and preferably, the structure of the phenolic acid will contain only one hydroxyl group and one carboxyl group bonded to the aromatic ring. However, it is rare if not impossible to commercially acquire a phenolic compound which is so pure that it contains only one species. Commercially available phenolic compounds usually contain a mixture of species, such as mono and di carboxyl substituted phenolics. Thus, while the preferable embodiment is one in which the phenolic acid contains only one of each group bonded to the aromatic ring, this embodiment includes a phenolic which contains a mixture of species in which the predominant(>70 mole percent) species has only one carboxy group and one hydroxyl group bonded to the aromatic ring.

One of the substituents on the aromatic ring of the phenolic acid is the hydrocarbyl group. While the hydrocarbyl group can comprise a wide variety of structures and atoms, it must have a predominantly hydrocarbon character. Included within the meaning of a hydrocarbyl group are the alkyl or alkenyl groups, the aliphatic substituted aromatic or alicyclics, or the aromatic or alicyclic substituted alkyls or alkenyls. Each of these groups may be branched or unbranched. The phenolic acid preferably contains at least 50 mole % species which have only one hydrocarbyl substituent.

The substituent on the substituted aryl amidopolyamine is at least one hydrocarbyl group having at least one carbon atom. Longer chain hydrocarbyl groups are preferred. All else remaining equal, a curing agent having longer chain hydrocarbyl substituents, i.e. 8 or more, preferably greater than 12, and most preferably 14 or more, tend to be more hydrophobic than the curing agents having short chain hydrocarbyl groups on the order of 1–7 carbon atoms. In many applications, the hydrophobic character of the hydrocarbyl substituent is desirable to improve the compatibility of the curing agent with the epoxy resin component. Further, long chain hydrocarbyl substituents are somewhat more flexible than their shorter chain counterparts, thus lowering the glass transition temperature of the curing agent. It is desirable to have a curing agent with a lowered glass transition temperature to improve its flow properties in low temperature curing conditions. Thus, the most preferred hydrocarbyl groups are those having 14 or more carbon atoms. Although there is no particular upper limit on number of carbon atoms, the most common number of carbon atoms used within this invention will be 14–24, more typically from 14–18, although hydrocarbons with up to 36 carbon atoms are also available.

Of the types of hydrocarbyl substituents, the alkyls are preferred. These can be branched or unbranched, preferably unbranched or having no more than I branch per 6 backbone carbon atoms. Examples of alkyl substituents having at least about 8 carbon atoms include octyl, nonyl, decyl, isodecyl, dodecyl, pentadecyl, eicosyl, triacontyl and the like, as well as radicals derived from substantially saturated petroleum fractions, olefin polymers and highly refined white oils or synthetic alkanes.

Other types of hydrocarbyl groups which are suitable include substituted hydrocarbyl groups; that is, groups containing non-hydrocarbon substituents which do not alter the predominantly hydrocarbon character of the group. Examples are halo, nitro, cyano, ether, carbonyl, and sulfonyl groups. Also included are hetero atoms which are atoms other than carbon present within a chain or ring otherwise composed of carbon atoms. Suitable hetero atoms include, for example, nitrogen, oxygen, and sulfur. Further included within the meaning of the hydrocarbyl group are the alkoxy compounds.

Preferably, no more than an average of one substituent or hetero atom will be present for each 10 carbon atoms in the hydrocarbyl group, and most preferably, the hydrocarbyl group does not contain any hetero atoms or substituents.

The phenolic acid may contain more than one hydrocarbyl substituent on the aromatic ring. The dihydrocarbyl substituted phenolic acids may have a long chain hydrocarbyl of 14 or more carbon atoms and a short chain hydrocarbyl of 1–4 carbon atoms attached to the aromatic ring, or both of the hydrocarbyls may be long chain. As noted above, however, preferably greater than 50 mole % of the species contain only one hydrocarbyl substituent.

The phenols on which the hydrocarbyl and carboxyl groups are situated are aromatic compounds containing at least one, and preferably one, hydroxyl group. Examples are phenol, α- or β-naphthols, resorcinol, hydroquinone, 4,4'-dioxydiphenyl, 4,4'-dioxydiphenylether, 4,4'-dioxydiphenylsulfone, 4,4'-dioxydiphenylmethane, the condensation products of phenol and formaldehyde known as novolacs, and bis(4-hydroxyphenyl)alkyls or ethers or sulfones optionally substituted with alkyl groups on the aromatic rings. Phenol is preferred.

To substitute the hydroxyl aromatic compound with the hydrocarbyl group, a hydrocarbon-based compound of the hydrocarbyl group as mentioned above is reacted with the hydroxyl aromatic compound at a temperature of about 50°–200° C. in the presence of a suitable catalyst such as aluminum chloride, boron trifluoride or zinc chloride.

The phenolic acid also contains at least one carboxyl group as a substituent, and preferably only one carboxyl group per aromatic ring. The carboxyl group is bonded directly to the aromatic phenolic ring, or indirectly to the ring through an aliphatic chain. Preferred, however, is a carboxyl group bonded directly to the aromatic ring of the phenolic acid at the ortho or para positions to the phenolic hydroxyl group. Further, within the meaning of a carboxyl group are the alkyl esters and anhydrides of the carboxyl substituents.

Examples of the carboxyl groups bonded to the phenolic aromatic ring are those derived from carboxylic acids containing 0–24 carbon atoms, not counting the carboxylic acid carbon. The carboxylic acids from which the substituents are derived include -formic acid (a -carboxy acid), -acetic acid, -proprionic acid, or -stearic acid substituents. A particularly preferred carboxyl group is a carboxy acid in view of its high reactivity with amines.

The phenolic acid containing the carboxyl and the hydrocarbyl groups can be prepared by methods which are known in the art as the "Kolbe-Schmitt reaction," which comprises reacting a salt, preferably an alkali metal salt, of the hydrocarbyl substituted phenol with carbon dioxide and subsequently acidifying the salt thus obtained. The conditions of the carbonation reaction are likewise well known to those skilled in the art. It may be carried out at atmospheric or superatmospheric pressure in a substantially inert, non-polar liquid diluent.

A particularly preferred phenolic acid is a hydrocarbyl substituted salicyclic acid. This phenolic acid is a good building block toward producing a curing agent which has good flow, reactivity, and compatibility with epoxy resins at low cure temperatures in the absence of external accelerators/catalysts, and a good balance of mechanical properties and weatherability. In a more preferred embodiment, the phenolic compound used in the invention is a salicyclic acid substituted with a 14–18 linear carbonalkyl group located at the o- or p-position to the phenolic hydroxyl group. The preparation of alkyl substituted salicyclic acids is described in U.S. Pat. No. 3,013,868, incorporated herein by reference in its entirety To manufacture the substituted aromatic glycidyl ester composition, the phenolic acid described above is reacted with an polyepoxide at an elevated temperature, typically from 140° C. to 180° C., for a time sufficient to substantially complete the reaction, usually from about 1 to about 8 hours. It is advisable not to let the reaction temperature rise too much above 170° C.–180° C. for an extended period of time in order to avoid the possibility of de-carboxylating the phenolic compound, which would result in the production of free phenolic compounds in the reaction mixture. The reaction can be conducted at any pressure ranging from a partial vacuum to superatmospheric pressure. To drive the esterification reaction between the carboxyl group on the phenolic compound and the polyepoxide compound to completion, it is preferred to apply a partial vacuum either during the course of the reaction or towards the tail end of the reaction. The reaction is substantially completed when free acid can no longer be detected in the composition. The ingredients can be mixed together and subsequently reacted, but preferably, the phenolic acid is added to the polyepoxide compound so as to reduce the possibility of reacting both of the oxirane groups on the polyepoxide compound with the phenolic acid.

The reaction between the polyepoxide compound and the phenolic acid are suitably carried out at molar ratios of at least 1:1, preferably greater than 1:1 such as at least 2:1, and even 3:1 on up. It is desirable to use a molar excess of the polyepoxide compound so that one of the oxirane groups on the polyepoxide compound is free to react with the polyamine compound and does not react with further phenolic acids. If a stoichiometric amount of the phenolic acid is added to the polyepoxide compound such as at a molar ratio of polyepoxide to phenolic acid of 0.5:1 or less (the stoichiometry proceeding upon the assumption that the phenolic acid has only one functional group, the acid group, and a diepoxide is used), then both of the oxirane groups will be consumed by the acid group on the phenolic compound. Therefore, a stoichiometric excess of oxirane groups (>0.5:1) is desired to ensure that the substituted aromatic glycidyl ester compound has free oxirane groups available for reaction with the polyamine compound.

The reaction between the phenolic acid and the polyepoxide compound may be carried out in the presence or absence of solvents or catalysts, typically in the presence of both. Suitable solvents include alcohols, ketones, esters, ethers of hydrocarbons. Examples of suitable solvents are butanol, methyl isobutyl ketone, toluene, ethylglycol acetate, xylene, benzyl alcohol, phthalic acid esters of monohydric alcohols, e.g. n-butanol, amylalcohol, 2-ethylhexanol, nonanol, benzyl alcohol, gamma-butyrolactone, delta-valero lactone, epsilon-caprolactone, lower and higher molecular weight polyols, e.g. glycerol trimethylol-ethane or -propane, ethyleneglycol, and ethoxylated or propoxylated polyhydric alcohols, either individually or in admixture.

If a catalyst is employed, one could use a Lewis acid, metal salts, and bases. Examples include triethylamine, benzyldimethylamine, tris(dimethylaminomethyl)phenol, dimethylethanolamine, n-methymorpholine, benzyl trimethyl ammonium chloride, ethyl triphenyl phosphonium salts, tetrabutyl phophonium salts, and stannous salts of carboxylic acids. Typical amounts of catalyst used range from 0.1 to 100 ppm.

The polyepoxide used in the invention is any polyepoxide having an average of 1.5 or more oxirane groups per molecule, preferably 1.7 or more oxirane groups. The polyepoxide compounds can be monomeric or polymeric, saturated or unsaturated, aliphatic, cycloaliphatic, aromatic or heteroaromatic and may be substituted, if desired, with other substitutents in addition to the epoxy groups with, for example, hydroxyl groups or halogen atoms such as bromine.

Suitable polyepoxide compounds are the reaction products of polyphenols and epihalohydrins, polyalcohols and epihalohydrins, amines and epihalohydrins, sulfur containing compounds and epihalohydrins, polycarboxylic acids and epihalohydrins or mixtures thereof.

Preferred polyepoxide compounds include, but are not limited to, any one of those represented by the formulas:

or

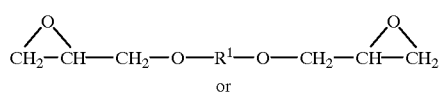
(VII)

or

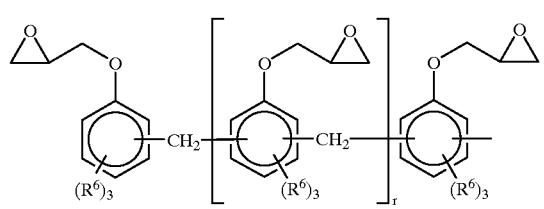
(VIII)

-continued
or

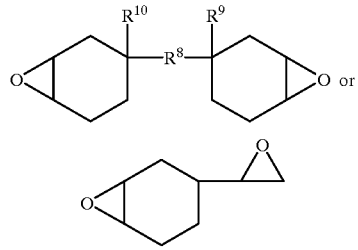
(IX)

wherein r is a real number from about 0 to about 6, $R^1$ is a divalent aliphatic group, a divalent cycloaliphatic group, a divalent aryl group, a polyoxyalkylene group, or a divalent arylaliphatic group, $R^6$ is independently a hydrogen or a $C_1$–$C_{10}$ alkyl group, $R^8$ is a divalent aliphatic group optionally containing ether or ester group(s) or together with $R^9$ or $R^{10}$ form a spiro ring optionally containing heteroatoms, and $R^9$ and $R^{10}$ are independently hydrogen or $R^9$ or $R_{10}$ together with $R^8$ form a spiro ring optionally containing heteroatoms such as oxygen.

$R_1$ can be a divalent cycloaliphatic group having the formula:

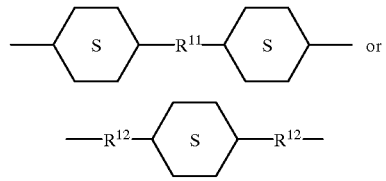

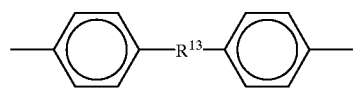

wherein $R_{11}$ and $R^{12}$ are each independently an alkylene group, or a divalentarylaliphatic group having the formula wherein $R^{13}$ is an alkylene group.

For the polyepoxide compound having a nominal functionality of two or more, the epoxy compound is preferably a diglycidyl ether of a dihydric phenol, diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl)propane (bisphenol-A);2,2-bis(4-hydroxy-3-tert-butylphenyl) propane; 1,1-bis(4-hydroxyphenyl)ethane; 1,1-bis(4-hydroxyphenyl)isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde(bisphenol-F). Diglycidyl ethers of dihydric phenols includes advancement products of the above diglycidyl ethers of dihydric phenols with phenolic compounds such as bisphenol-A, such as those described in U.S. Pat. Nos. 3,477,990 and 4,734,468.

Diglycidyl ethers of hydrogenated dihydric phenols can be produced, for example, by hydrogenation of dihydric phenols followed by glycidation with epihalohydrin in the presence of a Lewis acid catalyst and subsequent formation of the glycidyl ether by reaction with sodium hydroxide. Examples of suitable dihydric phenols are listed above.

(X)
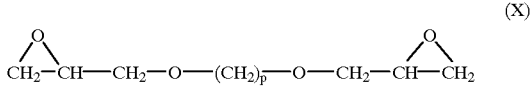

and Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. A representative formula is:

(XI)
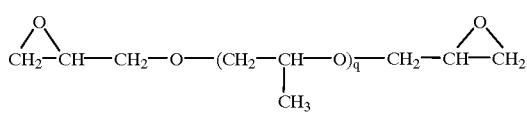

wherein p is an integer from 2 to 12, preferably from 2 to 6; and q is an integer from 4 to 24, preferably from 4 to 12.

Examples of suitable aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane.

Epoxy novolacs can be produced by condensation of formaldehyde and a phenol followed by glycidation by epihalohydrin in the presence of an alkali. The phenol can be for example, phenol, cresol, nonylphenol and t-butylphenol. Examples of the preferred epoxy novolacs include those corresponding to the formula VIII above. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with greater than one olefinic bond with peracetic acid. Examples of the preferred cycloaliphatic epoxies include those corresponding to the formula IX above. Examples of cycloaliphatic epoxies include, for example, 3,4-epoxycyclo-hexylmethyl-(3,4-epoxy)cyclohexane carboxylate, dicycloaliphatic diether diepoxy [2-(3,4-epoxy)cyclohexyl-5,5-spiro(3,4-epoxy)-cyclohexane-m-dioxane],bis(3,4-epoxycyclohexylmethyl) adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

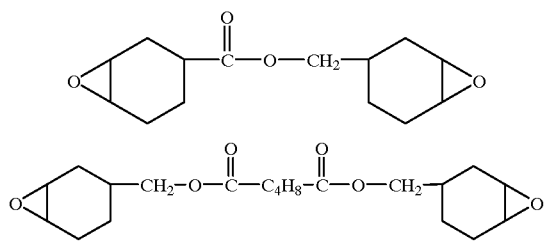

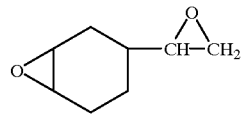

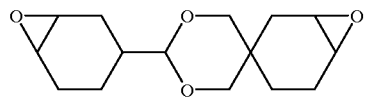

Commercial examples of the preferred epoxy compounds having a nominal functionality of two or more include, for example, EPON® Resins DPL-862, 828, 826, 825, 1001, EPONEX® Resin 1510, HELOXY® Modifiers 107, 67, 68, and 32; all available from Shell Chemical Company and Union Carbide Epoxy Resins ERL-4221, -4289, -4299, -4234 and -4206.

The reaction between the phenolic acid compound and the polyepoxide compound will produce a variety of species depending upon the particular phenolic acid functional sites which undergo reaction. The following reaction scheme represents two species produced between phenolic acid-polyepoxide reaction, where all of the carboxylic acid groups on the phenolic acid compound have been reacted:

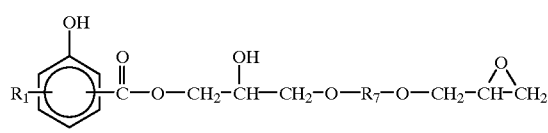

and

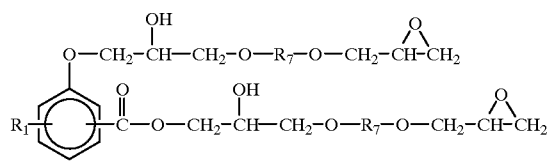

wherein $R_1$ is the hydrocarbyl substituent on the phenolic acid compound, and $R_7$ is the polyepoxide residue.

Once the substituted aromatic glycidyl ester composition is made, it is reacted with the c) polyamine compound and the d) monoglycidyl capping agent in the stated sequence or simultaneously in mixture, preferably sequentially to increase the number of species having the polyamine compound reacted into the molecule. However, adding the polyamine and monoglycidyl capping agent in mixture is also suitable for the purposes of the invention.

Preferably, at least one mole of the polyamine compound is reacted per mole of the substituted aromatic glycidyl esters, and more preferably the polyamine is reacted with the substituted aromatic glycidyl esters at a molar excess, such as at a molar ratio of 1.25:1 or more, more preferably 2:1 or more, in order to react out the all the oxirane groups and provide primary amino group termination. The reaction conditions are much like those described above with relation to the phenolic acid and the polyepoxide compound, except that typically no catalysts are needed. The temperature can range from 100° C. to 230° C., with the higher end of the temperature range initiated when vacuum distillation is applied. The substituted aromatic glycidyl ester composition is preferably added to the polyamine compound to ensure that the polyamine compound, once reacted, will have a free unreacted primary amine site available for reaction with the monoglycidyl capping agent. Once the amine reaction onto the substituted aromatic glycidyl ester composition is complete, the excess amine, if any, should be vacuum distilled off, typically at 20 in.Hg to 30 in.Hg for 30 to 480 minutes.

The polyamines useful for reaction onto the substituted aromatic glycidyl ester composition are those which have at lease two primary amine groups, one primary amine group used for reaction with the oxirane groups in the substituted aromatic glycidyl ester composition, and the other primary amine available for reaction with the monoglycidyl capping agent.

Examples of polyamines useful in the practice of the invention are those represented by the formula:

$$H_2N\text{—}X\text{—}[NH\text{—}X]_n\text{—}NH_2$$

wherein n is an average of integers between about 0 and 10, preferably between 1 and 4; and X is a divalent branched or unbranched hydrocarbon radical having about 1–18 carbons, one or more aryl or alkaryl groups, or one or more alicyclic groups. Preferably, X is a lower alkylene radical having 1–10, preferably 2–6, carbon atoms.

Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included. Specific examples of such polyamines include ethylene diamine, triethylenetetramine, tris(2-aminoethyl)-amine, 1,2- and 1,3-propylenediamine, trimethylene diamine, 1,2- and 1,4-butanediamine, hexamethylene diamine, decamethylene diamine, octamethylene diamine, diethylene triamine, triethylene tetramine, di(heptamethylene)triamine, tripropylene tetramine, tetraethylenepentamine, trimethylene diamine, pentaethylene hexamine, di(trimethylene)triamine, p- and m-xylylene diamine, methylene dianiline, 2,4-toluenediamine, 2,6-toluenediamine, polymethylene polyphenylpolyamine, and mixtures thereof. Higher homologs, obtained by condensing two or more of the above-illustrated alkylene amines, are also useful. More preferred are those polyamines containing at least one secondary amino group in addition to the at least two primary amino groups, and multiple divalent hydrocarbon radicals having 2–4 carbon atoms.

The ethylene type polyamines, examples of which are mentioned above, are especially useful for reasons of cost and effectiveness. Such polyamines are described in detail under the heading "Diamines and Higher Amines" in Kirk-Othmer, Encyclopedia of Chemical Technology, Second Edition, Vol. 7, pp. 22–39. They are prepared most conveniently by the reaction of an alkylene chloride with ammonia or by reaction of an ethylene imine with a ring-opening reagent such as ammonia. These reactions result in the production of the somewhat complex mixtures of alkylene polyamines, including cyclic condensation products such as piperazines. These mixtures are satisfactory in preparing the compositions of this invention.

Hydroxy polyamines, e.g., alkylene polyamines having one or more hydroxyalkyl substituents on the nitrogen atoms, are also useful in preparing amides of this invention. Preferred hydroxyalkyl-substituted alkylene polyamines are those in which the hydroxyalkyl group has less than about 10 carbon atoms. Examples of such hydroxyalkyl-substituted polyamines include N-(2-hydroxyethyl)-ethylenediamine, N,N'-bis(2-hydroxyethyl)ethylenediamine, monohydroxypropyl-substituted diethylene triamine, dihydroxypropyltetraethylenepentamine and N-(3-hydroxybutyl)tetramethylenediamine. Higher homologs obtained by condensation of the above-illustrated hydroxyalkyl-substituted alkylene amines through amino radicals or through hydroxy radicals are likewise useful.

Other types of polyamines which are useful include those in which one of the above described polyamines are reacted in stoichiometric excess with polyepoxide compounds or polycarboxylic acids to produce a primary amine terminated amine adduct having either aminealkyl hydroxy linkages or amide linkages along the adduct chain. This primary amine terminated polyamine adduct can then be used to react with the phenolic compound described above.

Once the polyamine compound is reacted onto the substituted aromatic glycidyl ester composition, the monoglycidyl capping agent reacts onto the free primary amine groups. As noted above, a larger number of the desired species are obtained if the polyamine compounds and the monoglycidyl capping agents are added sequentially, the latter being added after the polyamine is reacted and excess polyamine is preferably distilled off.

Tyically, a solvent is added at this point if one has not already been added in prior steps. The monoglycidyl capping agent adds onto the primary amine functionality relatively easy, in that no catalysts are needed, and the reaction temperature is fairly low, in the range of 80° C. to 110° C. There is no particular pressure limitation, and the reaction proceeds well at atmospheric pressures.

The capping agent is reacted with the adduct of the polyamine-substituted aromatic glycidyl ester adduct at a molar ratio of preferably 0.5:1 to preferably not more than about 2:1. While one can go much higher than a 2:1 ratio, it is not necessary to do so in order to convert the primary amine groups present on the polyamine-substituted aromatic glycidyl ester adduct into secondary amine groups through reaction with the capping agent. With respect to the preferable lower limit, not all of the free primary amine groups present in the adduct need to be reacted and converted into secondary amine groups. One will notice some reduction in blush even if the adduct is only partially capped with the monoglycidyl capping agent.

The monoglycidyl capping agent can be an aliphatic, alicyclic, or aromatic compound attached to a monoglycidyl functional group. Non-limiting examples of monoglycidyl capping agents which are suitable for use in the invention include:

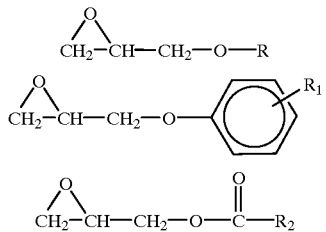

wherein R and $R_2$ are the same or different and are a branched or linear alkyl, an alkalicyclic, polyoxyalkyl, or alkenyl group having 2–100 carbon atoms, optionally branched,; and $R_1$ is hydrogen or a branched or unbranched alkyl having 1–18 carbon atoms. There may be more than one type of $R_1$ group attached to the aromatic ring.

These categories would include the unsaturated epoxy hydrocarbons of butylene, cyclohexene, styrene oxide and the like; epoxy ethers of monovalent alcohols such as methyl, ethyl, butyl, 2-ethylhexyl, dodecyl alcohol and others; epoxides of the alkylene oxide adducts of alcohols having at least 8 carbon atoms by the sequential addition of alkylene oxide to the corresponding alkanol (ROH), such as those marketed under the Neodol® name; epoxy ethers of monovalent phenols such as phenol, cresol, and other phenols substituted in the o- or p-positions with $C_1$–$C_{21}$ branched or unbranched alkyl aralkyl, alkaryl, or alkoxy groups such as nonylphenol; glycidyl esters of monocarboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, hereby incorporated by reference; epoxy esters of unsaturated alcohols or unsaturated carboxylic acids such as the glycidyl ester of neodecanoic acid, epoxidized methyl oleate, epoxidized n-butyl oleate, epoxidized methyl palmitoleate, epoxidized ethyl linoleate and the like; phenyl glycidyl ether; allyl glycidyl ethers, and acetals of glycidaldehyde.

Specific examples of monoglycidyl capping agents useful to the practice of the invention include alkyl glycidyl ethers with 1–18 linear carbon atoms in the alkyl chain such as butyl glycidyl ether ora mixture of $C_8$–$C_{14}$ alkyls, cresyl glycidyl ether, phenyl glycidyl ether, nonylglycidyl ether, p-tert-butylphenylglycidyl ether, 2-ethylhexyl glycidyl ether, and the glycidyl ester of neodecanoic acid.

The aliphatic based capping agents are usually hydrophobic in character, which tends to improve the flow properties of the epoxy-curing agent mixture at low temperatures, and tends to lower the glass transition temperature of the film or coating. The lower glass transition temperature improves the impact strength of the cured film. Aromatic based monoglycidyl capping agents, however, have the advantage of rendering the cured film more rigid, chemically resistant, and resistant to stresses at high temperatures. Any one of these types of capping agents may be used, and mixtures thereof are also advantageous to attain an overall balance of mechanical strength and chemical resistance.

The curing agents of the invention can optionally be mixed with other conventional curing agents. The amount of other conventional curing agents mixed in will depend upon the requirements placed upon the end product and the efficiencies one desires to achieve. If the end use does not require a product which has high end physical properties and/or it is not important to have lowered processing times, and/or the product is not stored for lengthy time periods, then greater amount of an inexpensive conventional curing agent can be mixed with the curing agent composition of the invention. The amount of the curing agent of the invention can range in the low end of from 1 to 50 wt. % based on the weight of all curing agents, but is preferably from 50 wt % to 100 wt. %.

Conventional curing agents are usually polyamines with at least 2 nitrogen atoms per molecule and at least two reactive amine hydrogen atoms per molecule. The nitrogen atoms are linked by divalent hydrocarbyl groups. Other hydrocarbyl groups such as aliphatic, cycloaliphatic or aromatic groups may also be singly linked to some of the nitrogen atoms. These polyamines contain at least 2 carbon atoms per molecule. Preferably polyamines contain about 2 to about 6 amine nitrogen atoms per molecule, 2 to about 8 amine hydrogen atoms per molecule, and 2 to about 50 carbon atoms.

Examples of the polyamines useful as conventional curing agents for epoxy resins include aliphatic polyamines such as ethylene diamine, diethylene triamine, triethylenetetramine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butanediamine, 1,3-butanediamine, 1,4-butanediamine, 1,5-pentanediamine, 1,6-hexane diamine, 2-methyl-1,5-pentanediamine, 2,5-dimethyl-2,5-hexanediamine and the like; cycloaliphatic polyamines such as isophoronediamine, 4,4'-diaminodicyclohexylmethane, menthanediamine, 1,2-diaminocyclohexane, 1,4-diaminocyclohexane, and diamines derived from "dimer acids" (dimerized fatty acids) which are produced by condensing the dimer acids with ammonia and then dehydrating and hydrogenating; adducts of amines with epoxy resins such as an adduct of isophoronediamine with a diglycidyl ether of a dihydric phenol, or corresponding adducts with ethylenediamine or m-xylylenediamine; aralphaticpolyamines such as 1,3-bis (aminomethyl)benzene; aromatic polyamines such as 4,4'-methylenedianiline, 1,3-phenylenediamine and 3,5-diethyl-2,4-toluenediamine; amidoamines such as condensates of fatty acids with diethylenetriamine, triethylenetetramine, etc; and polyamides such as condensates of dimer acids with diethylenetriamine, triethylenetetramine, etc. Some commercial examples of polyamines include EPI-CURE® Curing Agent 3140 (a dimer acid-aliphaticpolyamine adduct), EPI-CURE® Curing Agent 3270 (a modified aliphatic polyamine), EPI-CURE® Curing Agent 3274 (a modified aliphatic polyamine), EPI-CURE® Curing Agent 3295 (an aliphatic amine adduct), EPI-CURE® Curing Agent 3282 (an aliphatic amine adduct), EPI-CURE® Curing Agent 3055 (an amidoamine), EPI-CURE® Curing Agent 3046 (an amidoamine) and EPI-CURE® Curing Agent 3072 (modified amidoamine), and EPI-CURE® Curing Agent 3483 (an aromatic polyamine) available from Shell Chemical Company. Mixtures of polyamines can also be used.

The invention is also directed to two component epoxy compositions having an A epoxy resin component and a B curing agent component. The epoxy resin component has at least one 1,2-epoxy group per molecule. Mixtures of epoxy compounds having one epoxy functionality and two or more epoxy groups are also suitable. The epoxy compounds having two or more epoxy groups per molecule means that the nominal functionality is two or more. Generally epoxy resins contain a distribution of compounds with a varying number of 1,2-epoxy equivalency. The actual average functionality of these epoxy compounds is about 1.5 or more. Any of the epoxy compounds can be saturated or unsaturated, linear or branched, aliphatic, cycloaliphatic, aromatic or heterocyclic, and may bear substituents. Such substituents can include bromine or fluorine. They may be monomeric or polymeric, liquid or solid, but are preferably liquid or a low melting solid at room temperature.

The epoxy compounds can be of the glycidyl ether type prepared by reacting epichlorohydrin with a compound containing at least one aromatic hydroxyl group carried out under alkaline reaction conditions. Examples of other epoxy resins suitable for use in the invention include diglycidyl ethers of dihydric compounds, epoxy novolacs and cycloaliphatic epoxies. Specific examples of the epoxy resins useful in the A epoxy resin component are described above with reference to the reaction between the phenolic acid and the polyepoxide compound.

The two component epoxy resin composition is either solvent borne or solventless. Suitable solvents are described above, with preference given to ketones, alcohols, and xylene. Solventless epoxy resin compositions are those compositions which are applied in the absence of a solvent and in the absence of an aqueous medium.

The two component compositions of the invention are mixed and cured, preferably in the absence of external accelerators, in a wide range of temperatures ranging from −25° C. to 100° C. One advantage of the invention is that the curing agent composition of the invention and the epoxy resin can cure, once mixed, within 24 hours at 4.4° C., and even in as short a time as within 15 hours at 4.4° C. in the absence of external accelerators. This is unexpected since many, if not all, of the primary amine groups are reacted out with the monoglycidyl capping agent, thus otherwise lowering the reactivity of the curing agent. For measurement purposes, the two component mixture is "cured" or "curable" when it cures or has the capacity to cure to a hard gel (cotton free) at the designated temperature in the absence of external accelerators and at 50% relative humidity. At 25° C., the curing agent composition of the invention can cure an epoxy resin in as quick as 5 hours. At lower temperatures, the amount of time required for cure naturally increases, although due to the excellent compatibility between the curing agent composition and the epoxy resin used in the invention, the overall time to cure at any given temperature is dramatically reduced compared to epoxy resins mixed with other types of curing agents.

Advantageously, the curable epoxy resin composition is cured in the absence of catalyst compounds which accelarate the reaction between the curing agent and the epoxy resin, commonly known as accelerators An accelarator, however, can be included, if desired, to increase the cure rate of the epoxy resin-curing agent system beyond that already achieved in its absence. Various amine-compatible accelarator scan be used as long as they are soluble in the amine curing agents. Examples of accelarators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxyl ic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; and imides such as, for example, phthalimide, succinimide, perylenetetracarboxylicdiimide and saccharin.

When the cure rate at the desired temperature is suboptimal, it is sometimes desirable to include the accelerator. For example, for adhesive applications and civil engineering applications where application at low temperature is desired, it may be desirable to include the accelarator. The accelarators are typically present in an amount of from about 0.1 weight percent to about 10 weight percent, preferably to 5 weight percent, based on the epoxy resin, if used at all.

The storage stable composition of the invention may include other additives, such as fillers, elastomers, uv-stabilizers, extenders, plasticizers, accelerators, pigments, reinforcing agents, flow control agents and flame retardants depending on the application.

For coating applications, the curable two component epoxy resin composition can also contain pigments of the conventional type such as iron oxides, lead oxides, strontium chromate, carbon black, titanium dioxide, talc, barium sulfate, phthalocyanine blue and green, cadmium red, iron blue, chromic green, lead silicate, silica, silicates and the like. Such pigments can be added to the polyamine curing agent component or the epoxy resin component prior to mixing them together. Their amounts usually range from 20 to 100 pbw based on the weight of the epoxy resin and the curing agent composition.

For floor topping application, the curable epoxy resin composition can also contain a filler such as sand, other siliceous materials, iron or other metals. Small amounts of thixotropic agents, coloring agents, inert plasticizers, and leveling agents can also be incorporated in the curable epoxy resin composition if desired. These curable flooring compositions can be trowelled, sprayed or brushed on to a floor substrate.

The curing agent composition of the invention contains no added solvents or water when used in powder coating applications. In applications where the curing agent composition is applied wet to a substrate, the curing agent composition is non-aqueous and is either dissolved in solvents or is applied neat, or solventless. Preferably, some amount of solvent is used in the curing agent composition and in the two component epoxy resin composition to reduce the viscosity of the curing agent and/or the epoxy resin compositions, especially in cold temperature applications. The reduction in viscosity facilitates the handling and application of the composition in various environments. Suitable solvents include alcohols, ketones, esters, ethers of hydrocarbons. Examples of suitable solvents are butanol, methyl isobutyl ketone, toluene, ethylglycol acetate, xylene, benzyl alcohol, phthalic acid esters of monohydric alcohols, e.g. n-butanol, amylalcohol, 2-ethylhexanol, nonanol, benzyl alcohol, gamma -butyrolactone, delta-valerolactone, epsilon-caprolactone, lower and higher molecular weight polyols, e.g. glycerol trimethylol-ethane or -propane, ethyleneglycol, and ethoxylated or propoxylated polyhydric alcohols, either individually or in admixture. The amount of solvent can range from 0 to 80 wt. %. The solids concentration can range from 20 wt. % to 100 wt. %, preferably from 65 wt. % to 85 wt. %.

Defoamers, tints, slip agents, thixotropes, etc., are common auxiliary components to most coatings and may be employed in the composition of the present invention. Flow control agents are typically used in amounts ranging from 0.05 to 5 wt. %, based on the combined weight of the epoxy resin and the curing agent composition.

Re-inforcing agents may be added to either of the components, and include natural and synthetic fibers in the form of woven, mat, monofilament, chopped fibers and the like. Other materials for re-inforcing include glass, ceramics, nylon, rayon, cotton, aramid, graphite and combinations thereof. Suitable fillers include inorganic oxides, inorganic carbonates, ceramic microspheres, plastic microspheres, glass microspheres, clays, sand, gravel and combinations thereof. The fillers can be used in amounts suitably from 0 to 100 pbw of the combined epoxy/curing agent components.

Aside from coating applications, the curing agent compositions of the invention and the two component compositions utilizing the curing agents composition scan be used in such applications as flooring, casting, crack or defect repair, molding, adhesives, potting, filament winding, encapsulation, structural and electrical laminates, composites and the like.

A typical use for the two component compositions of the invention is in coatings. The heat-curable coating composition can be applied to a substrate by brush, spray, or rollers. Alternatively, the curing agent compositions can be mixed and dried to a powder for powder coating applications. In the case where the coating is applied wet, the epoxy resin composition is preferably a liquid resin, a semi solid resin, or in solution, at the application temperature. The same is true for the curing agent composition.

The curing agent compositions of the invention can also be used in thermosetting powder coating compositions prepared by the various methods known to the powder coating industry: dry blending, melt compounding by two roll mill or extruder and spray drying. Typically the process used is the melt compounding process: dry blending solid ingredients in a planetary mixer and then melt blending the admixture in an extruder at a temperature within the range of about 80° C. to 130° C. The extrudate is then cooled and pulverized into a particulate blend.

The thermosetting powder composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of about 2.0 to about 15.0 mils.

The substrate can optionally be preheated prior to application of a powder composition to promote uniform and thicker powder deposition. After application of the powder, the powder-coated substrate is baked, typically at about 120° C., preferably from about 150° C., to about 205° C. for a time sufficient to cure the powder coating composition, typically from about 1 minute to about 60 minutes, preferably from about 10 minutes to about 30 minutes.

The following examples illustrate an embodiment of the invention and are not intended to limit the scope of the invention.

EXAMPLES

| | |
|---|---|
| TETA | is triethylene tetramine commercially available from Union Carbide having a typical amine value of about 1436 mg KOH/g. |
| HELOXY® Modifier 62 | is a commercial grade of ortho-cresyl glycidyl ether manufactured by Shell Chemical Company, that is produced by treatment of ortho-cresol with epichlorohydrin and sodium hydroxide. HELOXY Modifier is a thin liquid having a viscosity at 25° C. of about 7 centipoise and an epoxide equivalent weight of about 175 to about 195. |
| EPON® Resin 828 | is a diglycidyl ether liquid epoxy resin commercially available from Shell Chemical Company. |

Example 1

This example illustrates the synthesis of the substituted aromatic glycidyl ester composition. 500 grams of EPIKOTE 828 in xylene, which is a bisphenol A based epoxy resin available from Shell Chemicals Europe; 327 grams of a 63 wt. % 3-alkyl substituted salicyclic acid mixture in xylene (corresponding to about 20 mole % per epoxy group), in which the alkyl group contains from 14 to 18 carbon atoms and the mixture contains less than 15 mole % of $C_{14}$–$C_{18}$ alkyl phenols and less than 5 mole % of dicarboxylic acid species; and 0.15 grams of ethyltripenylphosphoniumiodide were mixed together in a vessel equipped with a condenser. The reaction temperature was increased to 175° C. (heating up to 110° C. in 30 minutes, holding for another 30 minutes at 110° C. and then heating to 175° C. within the next 60 minutes, and holding the temperature at 175° C. for the next 30 minutes, for a total reaction time of 2.5 hours. Water and xylene were stripped off. Subsequently, the substituted aromatic glycidyl ester composition was allowed to cool. Once cooled, the product was dissolved in xylene to 85 wt % solids. The product had an acid number of zero (theoretical) in solution and an acid number of zero (theoretical) based on solids. This product was designated as SSA-1. The same product was further reduced in concentration to an 80 wt. % solids by adding more xylene to SSA-1. The more diluted product having 80 wt. % solids was designated as SSA-2.

Example 2

In this example, a substituted aromatic glycidyl ester composition was also made using the same ingredients and procedure as in Example 1, except that only the amount of the substituted salicyclic acid having 14 to 18 carbon atom substitution corresponded to 5 mole % per epoxy group instead of 20 mole %. The product was dissolved in xylene to give a solution having 95 wt. % solids. This product was designated as SSA-3. This product was dissolved with more xylene to give a solution with 85 wt % solids. This more diluted product was designated as SSA-4.

Example 3

This example demonstrates the synthesis of the curing agent of the invention based on SSA-2.

A 2000 ml. 4-necked round-bottomed flask was equipped with a condenser having a water trap, a nitrogen inlet, an acid inlet, and the TETA inlet. The flask was flushed with nitrogen. 468.54 g of TETA was charged to a flask and warmed to 93° C. over a fifteen minute period. Then, 471.00 g of SSA-2 was added slowly over a period of 1 hour, 25 minutes, and held at about 93° C. for about 1 more hour. Subsequently, the temperature was increased to about 230° C. for the remainder of the reaction, which lasted for another 6 hours, during which a vacuum was pulled to about 25 in.Hg–27 in.Hg to distill off unreacted TETA and xylene. About 91.52 g of xylene and 312.36 g of TETA were collected. After that, the reaction was allowed to cool overnight. The amine value was measured at 421 mg KOH/g.

The next day, the reaction product was heated to 230° C. to confirm that no more TETA would distill, and then cooled to 115° C., at which time 118.76 g of n-butanol was added. At about 93° C., 176.91 g of HELOXY® 62 capping agent was added dropwise over a 40 minute period and reacted for about another 40 minutes at that temperature. Then, 356.28 g of xylene was added to produce a curing agent solution (CA-2) having about 65 wt % solids, an amine value of 189 mg KOH/g based on the solution, and an amine value of 291 mg KOH/g based on solids.

Example 4

This example demonstrates the synthesis of the curing agent of the invention based on SSA-4.

A 2000 ml 4-necked flask was equipped with a condenser having a water trap, a nitrogen inlet, an acid inlet, and the TETA inlet. The flask was flushed with nitrogen. 468.54 g of TETA was charged to a flask and warmed to 93° C. over a half hour period. 262.65 g of SSA-4 was added to the TETA over a 1 hour, 5 minute period, and held at about 94° C. for 1 more hour, after which the temperature was slowly increased to a maximum of 230° C. under a vacuum of about 28.5 in.Hg to distill off unreacted TETA and xylene. The resulting product had an amine value of 580 mg KOH/g. About 39.9 g of xylene and 312.36 g of TETA were distilled off and recovered.

The product was cooled to about 106° C., at which time 59.55 g of n-butanol was added, further reducing the temperature to 92° C. Subsequently, 176.91 g of HELOXY® 62 modifier was added over a 25 minute period, after which 178.66 g of xylene was added and the product allowed to cool. This product had a 78.42 wt. % solids concentration, which was subsequently reduced to a 67.48 wt. % solids concentration as the final curing agent (CA-4) by addition of more xylene and butanol in a 3:1 weight ratio. The amine value in solution was 237 mg KOH/g, and on solids basis was 352 mg KOH/g.

Example 5

This example demonstrates the physical and chemical properties of the curing agent and films made with the curing agent of the invention. To the curing agent of CA-2 was added 0.37 g of BYK 346 flow control agent, and to CA-4 was added 0.39 g of BYK-346 flow control agent. Each of the curing agents were reacted in a 1:1 stoichiometric calculated ratio with the epoxy resin. The cured films were made at room temperature and at 4.4° C. for the designated amount of time, and tested for their physical properties. For compatibility between the epoxy resin and the curing agent, the two were combined in mass rather than as a film, and inspected by eye for haziness. The following ASTM test methods were employed for the corresponding tests:

| Test | ASTM |
|---|---|
| Pencil Hardness | D3363 |
| Direct Impact | D2794 |
| Reverse Impact | D2794 |
| Adhesion X-cut | D3359 |
| Flexibility, Conical Mandril | D522 |

TABLE 1

| Curing Agent | CA-2 | CA-4 |
|---|---|---|
| Amount (g) | 58.48 | 52.89 |
| EPON ® 828 (g) | 41.15 | 46.72 |
| Compatibility, at 4.4 and 25° C. | | |
| Initial | Clear | Clear |
| t = 30 min. | Clear | Clear |
| CURE CONDITIONS: 14 DAYS AT 25 ± 2° C., 50 ± 5% RH, COLD ROLLED STEEL | | |
| % binder solids, calc. | 75.01 | 77.74 |
| After 24 Hour Cure | | |
| Soft gel, set to touch (h) | 2.25 | 2.5 |
| Hard gel, cotton free (h) | 4 | 4 |
| Mar resistant (h) | 5.75 | 5 |
| Film Hardness | H | H |
| After 7 Day Cure | | |
| Film Hardness | H | H |
| After 14 Day Cure | | |
| Film Hardness | 2H | H |
| Direct Impact, in/lb | p64,f68 | p68,f72 |
| Reverse impact, in/lb | p8,f12 | p68,f72 |
| Adhesion, X-cut | 5A | 5A |
| Flexibility, Mandrel Test | pass ⅛ in | pass ⅛ in |
| % Elongation | 32 | 32 |

TABLE 1-continued

| Curing Agent | CA-2 | CA-4 |
|---|---|---|
| MIBK Resistance, Min, spot test | 50 (#F) | >60 (#HB) |
| MEK Resistance, (#double rubs) | >200 | >200 |
| CURE CONDITIONS: 14 DAYS AT 4.4° C., 60% RH, DETERGENT WASHED GLASS PANELS | | |
| % Binder Solids | 75.01 | 77.74 |
| After 24 Hour Cure | | |
| Soft gel, set to touch (h) | 5 | 4.5 |
| Hard gel, cotton free (h) | 11 | 9 |
| Mar resistance, through dry (h) | 18.5 | 13.5 |
| Film Hardness | 5B | 5B |
| After 7 Day Cure | | |
| Film Hardness | HB | HB |
| After 14 Day Cure | | |
| Film Hardness | HB | HB |
| MIBK Risistance, min (spot test) | 15 (#2B) | 45 (#2B) |
| MEK Resistance, (#double rubs) | >200 | >200 |

The results indicate that the curing agents of the invention have good compatibility immediately upon mixing with the epoxy resin both at room temperature and at sub-ambient temperatures, such as 4.4° C. The cure rates at room temperature and sub-ambient temperature are quick even in the absence of external accelarators/catalysts. Further, the cured films had good hardness.

What we claim is:

1. A heat curable two component epoxy composition comprising an A component epoxy resin and a B component curing agent composition, said curing agent composition comprising a reaction product:
    a) phenolic acid substituted with at least one carboxyl group and at least one hydrocarbyl group having at least 1 carbon atom, reacted with
    b) a polyepoxide compound at a molar ratio of at least 0.5:1, respectively, to produce a substituted aromatic glycidyl ester compound, followed by reacting said substituted aromatic glycidyl ester compound with
    c) a polyamine compound having at least two primary amine groups; and
    d) a monoglycidyl capping agent.

2. The composition of claim 1, wherein said heat curable composition is in the absence of external accelerators.

3. The composition of claim 2, wherein said heat curable composition is curable at 4.4° C. within 24 hours.

4. The composition of claim 3, wherein said heat curable composition is curable at 4.4° C. within 15 hours.

5. The composition of claim 2, wherein said heat curable composition is curable at 25° C. within 5 hours.

6. The composition of claim 2, wherein said B component is immediately compatible at 4.4° C. upon combining with a diglycidyl ether of Bisphenol-A.

7. The composition of claim 2, wherein the curing agent composition comprises the reaction product of the phenolic acid compound with the polyepoxide compound to produce a substituted aromatic glycidyl ester compound, and subsequently combining and reacting said polyamine compound and said monoglycidyl capping agent with said aromatic glycidyl ester compound.

8. The composition of claim 7, wherein said phenolic acid compound and said polyepoxide compound are reacted to substantial completion prior to reaction with the polyamine compound.

9. The composition of claim 8, wherein the reaction between the polyepoxide compound and the phenolic acid are carried out at a stoichiometric excess of polyepoxide compound.

10. The composition of claim 9, wherein the polyepoxide compound comprises a compound represented by the formulas:

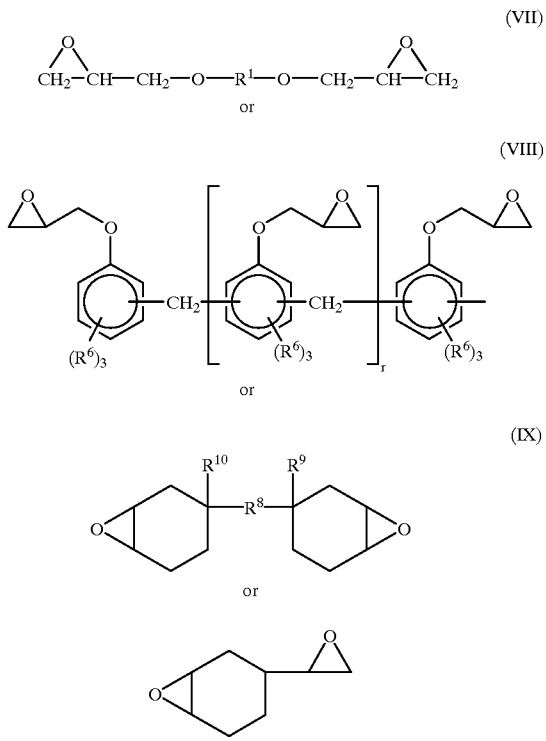

11. The composition of claim 9, wherein the phenolic acid compound comprises a substituted salicyclic acid.

12. The composition of claim 11, wherein the phenolic acid compound comprises salicyclic acid substituted with a branched or unbranched 14 to 24 carbon alkyl group.

13. The composition of claim 12, wherein said glycidyl ester is reacted with said polyamine compound to make a glycidyl ester-amine adduct, followed by combining and reacting said d) monoglycidyl capping agent with said glycidyl ester-amine adduct.

14. The composition of claim 13, wherein at least one mole of the polyamine compound is reacted per mole of the substituted aromatic glycidyl esters.

15. The composition of claim 14, wherein the polyamine compound further contains at least one secondary amine group.

16. The composition of claim 15, wherein the monoglycidyl capping agent is reacted with the said adduct at a molar ratio of 0.5:1 to 2:1.

17. The composition of claim 16, wherein the monoglycidyl capping agent comprises an alkyl glycidyl ether having 2–18 carbon atoms or an alkaryl glycidyl ether wherein the alkyl has 1–24 carbon atoms.

18. The composition of claim 15, wherein said curing agent composition further contains other amine or phenolic curing agents, and the amount of said curing agent reaction product is from 1–50 wt. %, based on the combined weight of all ingredients in a curing agent component.

19. The composition of claim 1, wherein said heat curable composition is non-aqueous.

20. A method of making a curing agent composition comprising reacting:
a) phenolic acid substituted with at least one carboxyl group and at least one hydrocarbyl group having at least 1 carbon atom, reacted with
b) a polyepoxide compound at a molar ratio of at least 0.5:1, respectively, to produce a substituted aromatic glycidyl ester compound, followed by reacting said substituted aromatic glycidyl ester compound with
c) a polyamine compound having at least two primary amine groups; and
d) a monoglycidyl capping agent.

21. The method of claim 20, wherein said composition comprises a compound represented by the formula:

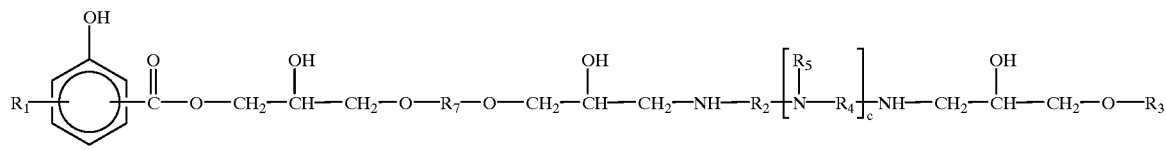

wherein r is a real number from about 0 to about 6, $R^1$ is a divalent aliphatic group, a divalent cycloaliphatic group, a divalentaryl group, or a divalentarylaliphatic group; $R^6$ is independently a hydrogen or a $C_1$–$C_{10}$ alkyl group; $R^8$ is a divalentaliphatic group optionally containing ether or ester group(s) or together with $R^9$ or $R^{10}$ form a spiro ring optionally containing heteroatoms; and $R^9$ and $R^{10}$ are independently hydrogen or $R^9$ or $R^{10}$ together with $R^8$ form a Spiro ring optionally containing heteroatoms.

wherein
$R_1$ is a branched or unbranched, substituted or unsubstituted, monovalent hydrocarbyl group having more than 12 carbon atoms;
$R_2$ is a branched or unbranched, substituted or unsubstituted, divalent hydrocarbyl group having 2–24 carbon atoms, or

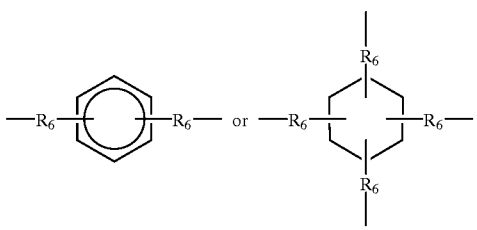

wherein

R₄ is a branched or unbranched, substituted or unsubstituted, divalent hydrocarbyl having 2–6 carbon atoms, R₅ is hydrogen or a branched or unbranched, substituted or unsubstituted, monovalent hydrocarbyl having 1–24 carbon atoms;

n has an average value from 1 to 10; and

R₃ is a branched or unbranched monovalent hydrocarbyl having from 1 to 24 carbon atoms, an aryl group, an alkaryl group, or an aralkyl group.

22. The method of claim 20, wherein the phenolic acid compound is reacted with the polyepoxide compound to produce a substituted aromatic glycidyl ester compound, and subsequently combining and reacting said polyamine compound and said monoglycidyl capping agent with said aromatic glycidyl ester compound.

23. The method of claim 20, wherein said phenolic acid compound and said polyepoxide compound are reacted to substantial completion prior to reaction with the polyamine compound.

24. A. The method of claim 22, wherein the reaction between the polyepoxide compound and the phenolic acid are carried out at molar ratios of greater than 1:1, respectively.

25. The method of claim 22, wherein the phenolic acid compound comprises a substituted salicyclic acid.

26. The method of claim 25, wherein the phenolic acid compound comprises salicyclic acid substituted with an 8 to 36 carbon alkyl group.

27. The method of claim 26, wherein the salicyclic acid is substituted with a branched or unbranched 14 to 24 carbon alkyl group.

28. The method of claim 22, wherein said glycidyl ester is first reacted with said polyamine compound to make a glycidyl ester-amine adduct, followed by combining and reacting said d) monoglycidyl capping agent with said glycidyl ester-amine adduct.

29. The method of claim 28, wherein at least one mole of the polyamine compound is reacted per mole of the substituted aromatic glycidyl esters.

30. The method of claim 28, wherein the substituted aromatic glycidyl ester compound is added to the polyamine compound.

31. The compound of claim 28, wherein the polyamine compound further contains at least one secondary amine group.

32. The method of claim 28, wherein the monoglycidyl capping agent is reacted with the said adduct at a molar ratio of 0.5:1 to 2:1.

33. The method of claim 32, wherein the monoglycidyl capping agent comprises an alkyl glycidyl ether having 2–18 carbon atoms or an alkaryl glycidyl ether wherein the alkyl has 1–24 carbon atoms.

34. The method of claim 20, wherein said curing agent composition is in the absence of external accelerator compounds.

35. The method of claim 34, wherein said curing agent composition is curable at 4.4° C. within 15 hours.

36. The method of claim 20, wherein said curing agent composition is immediately compatible with a diglycidyl ether of Bisphenol-A.

37. The method of claim 20, wherein said curing agent is non-aqueous.

38. The method of claim 37, wherein said curing agent is solventless.

39. The method of claim 37, wherein a solvent is added to said curing agent to render a curing agent composition having from 65 to 85 wt. % solids.

40. A powder coating composition comprising an A component epoxy resin and a B component curing agent composition, said curing agent composition comprising the reaction product of:

a) a phenolic acid substituted with at least one carboxyl group and at least one hydrocarbyl group having at least 1 carbon atom first reacted with b) a polyepoxide compound at a molar ratio of at least 0.5:1, respectively, to make a substituted aromatic glycidyl ester compound;

c) followed by combining and reacting with a polyamine compound having at least two primary amine groups and d) a monoglycidyl capping agent.

41. The powder coating composition of claim 40, wherein the a) compound comprises a $C_{14}$–$C_{36}$ substituted salicyclic acid, said polyepoxide is reacted with said salicyclic acid in stoichiometric excess, said polyamine compound has at least one secondary amine group and is reacted in stoichiometric excess with said substituted aromatic glycidyl ester compound, and said monoglycidyl capping agent is combined and reacted after reaction between the polyamine compound and the substituted aromatic glycidyl ester compound has reacted.

42. A coating comprising the heat cured reaction product of an A component epoxy resin and a B component curing agent composition, said curing agent composition comprising the reaction product of:

a) a phenolic acid substituted with at least one carboxyl group and at least one hydrocarbyl group having at least 1 carbon atom first reacted with b) a polyepoxide compound at a molar ratio of at least 0.5:1, respectively, to make a substituted aromatic glycidyl ester compound;

c) followed by combining and reacting with a polyamine compound having at least two primary amine groups and d) a monoglycidyl capping agent.

43. The coating of claim 42, wherein the a) compound comprises a $C_{14}$–$C_{36}$ substituted salicyclic acid, said polyepoxide is reacted with said salicyclic acid in stoichiometric excess, said polyamine compound has at least one secondary amine group and is reacted in stoichiometric excess with said substituted aromatic glycidyl ester compound, and said monoglycidyl capping agent is combined and reacted after reaction between the polyamine compound and the substituted aromatic glycidyl ester compound has reacted.

44. The coating of claim 42, wherein the curing agent composition is non-aqueous and is in the absence of an external accelerator compound.

* * * * *